US012183219B2

(12) United States Patent
Djelloul

(10) Patent No.: US 12,183,219 B2
(45) Date of Patent: Dec. 31, 2024

(54) DIGITAL KAKEMONO

(71) Applicant: DJTAL MEDIA, Allonville (FR)

(72) Inventor: Serge Djelloul, Allonville (FR)

(73) Assignee: DJTAL MEDIA, Allonville (FR)

( * ) Notice: Subject to any disclaimer, the term of this patent is extended or adjusted under 35 U.S.C. 154(b) by 135 days.

(21) Appl. No.: 17/757,088

(22) PCT Filed: Sep. 18, 2020

(86) PCT No.: PCT/FR2020/051619
§ 371 (c)(1),
(2) Date: Jun. 9, 2022

(87) PCT Pub. No.: WO2021/116542
PCT Pub. Date: Jun. 17, 2021

(65) Prior Publication Data
US 2023/0005396 A1 Jan. 5, 2023

(30) Foreign Application Priority Data
Dec. 12, 2019 (WO) ................. PCT/FR2019/053044

(51) Int. Cl.
*G09F 15/00* (2006.01)
*G09F 9/302* (2006.01)

(52) U.S. Cl.
CPC ........ *G09F 15/0062* (2013.01); *G09F 9/3026* (2013.01); *G09F 15/0068* (2013.01)

(58) Field of Classification Search
CPC . G09F 15/0062; G09F 9/3026; G09F 15/0068
See application file for complete search history.

(56) References Cited

U.S. PATENT DOCUMENTS 4,078,325 A * 3/1978 Valentine .................. G09F 5/00
40/388
4,194,313 A * 3/1980 Downing .............. B29C 53/063
428/116
(Continued)

FOREIGN PATENT DOCUMENTS

AT 515846 A1 12/2015
CN 105185262 A 12/2015
(Continued)

OTHER PUBLICATIONS

International Search Report for corresponding International Application No. PCT/FR2020/051619 mailed Feb. 25, 2021.
(Continued)

*Primary Examiner* — David R Dunn
*Assistant Examiner* — Christopher E Veraa
(74) *Attorney, Agent, or Firm* — CGT IP Law

(57) ABSTRACT

The kakemono-type electronic display device, which can be reconfigured between a stowed configuration and an operational configuration, includes a structure including a set of paired adjacent profiled panels, hinging means between two adjacent profiled panels, and a set of electronic display screens, an electronic display screen of the set of electronic display screens being associated with and fitted to a profiled panel of the set of profiled panels, the hinging means being arranged such that, in the stowed configuration, the structure is accordion-folded.

15 Claims, 9 Drawing Sheets

(56) References Cited

U.S. PATENT DOCUMENTS

| | | | | | | |
|---|---|---|---|---|---|---|
| RE30,777 | E | * | 10/1981 | Ytter | E05D 5/0238 | 160/351 |
| 4,417,430 | A | * | 11/1983 | Loikitz | F25D 23/065 | 52/582.2 |
| 4,436,135 | A | * | 3/1984 | Ytter | G09F 15/0068 | 160/381 |
| 4,443,911 | A | * | 4/1984 | Bannister | E04B 2/7431 | 52/239 |
| 4,566,211 | A | * | 1/1986 | Gustafson | G09F 15/0068 | 40/605 |
| 4,722,146 | A | * | 2/1988 | Kemeny | E04B 2/7429 | 52/800.11 |
| 4,912,866 | A | * | 4/1990 | Bannister | G09F 1/12 | 40/733 |
| 4,958,671 | A | * | 9/1990 | Bove | E04B 2/7429 | 160/351 |
| 5,024,015 | A | * | 6/1991 | Quarles, Jr. | G09F 15/0068 | 40/605 |
| 5,067,543 | A | * | 11/1991 | Bove | E04B 2/7429 | 160/369 |
| 5,287,909 | A | * | 2/1994 | King | A47G 5/00 | 160/229.1 |
| 5,502,938 | A | * | 4/1996 | Backer | G09F 15/0068 | 52/582.1 |
| 5,515,900 | A | * | 5/1996 | West | G09F 15/0068 | 160/230 |
| 5,626,926 | A | * | 5/1997 | Roberts | G09F 15/0068 | 40/733 |
| 5,900,848 | A | * | 5/1999 | Haneda | G06F 1/1643 | 361/679.04 |
| 6,009,930 | A | * | 1/2000 | Jantschek | E04B 2/7431 | 160/352 |
| 6,430,779 | B1 | * | 8/2002 | Goldsmith | E05D 3/186 | 16/382 |
| 6,926,375 | B2 | * | 8/2005 | Nagamine | H05K 5/0021 | 40/550 |
| 8,104,204 | B1 | * | 1/2012 | Syrstad | G09F 9/3026 | 40/544 |
| 2005/0210722 | A1 | * | 9/2005 | Graef | G09F 9/3026 | 345/82 |
| 2008/0073913 | A1 | * | 3/2008 | Gu | E05C 5/00 | 292/65 |
| 2011/0308120 | A1 | * | 12/2011 | Heo | G09F 13/22 | 362/237 |
| 2014/0259840 | A1 | * | 9/2014 | Placko | A47G 1/06 | 40/766 |
| 2017/0031386 | A1 | * | 2/2017 | Engel | F16M 11/42 | |
| 2021/0304642 | A1 | * | 9/2021 | Lee | G06F 1/1681 | |

FOREIGN PATENT DOCUMENTS

| | | | |
|---|---|---|---|
| CN | 106466088 | A | 3/2017 |
| CN | 209708576 | A | 11/2019 |
| JP | H06-010569 | U | 2/1994 |
| KR | 20-2017-0000157 | U | 1/2017 |
| WO | 02/33685 | A1 | 4/2002 |
| WO | 2014/174156 | A1 | 10/2014 |

OTHER PUBLICATIONS

Written Opinion Report for corresponding International Application No. PCT/FR2020/051619 dated Feb. 25, 2021.

* cited by examiner

DIGITAL KAKEMONO

CROSS-REFERENCE TO RELATED APPLICATIONS

This application is a U.S. National Stage entry of PCT/FR2020/051619, filed Sep. 18, 2020, which claims benefit of priority to International Application No. PCT/FR2019/053044, filed Dec. 12, 2019, the entire disclosures of which are hereby incorporated herein by reference.

TECHNICAL FIELD OF THE INVENTION

The invention relates to an electronic display device of the kakemono type.

PRIOR ART

At present, display devices of the kakemono type are in the form of a flexible film which can be rolled up, and is unrolled by hooking it onto the top of a telescopic pole positioned on a foot. However, the information which is printed on the flexible film is static, and can not be modified. In order to make it possible to modify this information partly, a kakemono has been produced comprising a known flexible film, on which a space is provided, and means for securing an electronic display screen. A device of this type is described in document WO2014/174156. However, this device is not satisfactory, since it requires delicate handling in order to put the kakemono into place as well as put it away, while not making it possible to display complete information which develops over a period of time, and can thus be modified as required.

SUMMARY OF THE INVENTION

An objective of the invention is to provide a display device of the kakemono type which makes it possible to display information that can be developed or modified as required, in a simple manner, and which is easy to use.

For this purpose, according to the invention, an electronic display device of the kakemono type is provided which can be reconfigured between a configuration of transport and a configuration of use, the device comprising a structure comprising a series of profiled panels adjacent in pairs, means for articulation between two adjacent profiled panels, and a series of electronic display screens, an electronic display screen of the series of electronic display screens being associated with, and assembled on, a profiled panel of the series of profiled panels, the means for articulation being arranged such that, in the configuration of transport, the structure is folded in the form of an accordion.

Advantageously, but optionally, the electronic display device of the kakemono type according to the invention has at least one of the following technical characteristics:

- the means for articulation comprise an elongate element which is at least partly resiliently deformable, comprising a first end secured on one of the two profiled panels adjacent in pairs, and a second end secured on the other one of the two profiled panels adjacent in pairs;
- the elongate element is positioned within the profiled parts, which are designed to come into position abutting one another in the configuration of use of the device, of each of the two adjacent panels;
- the means for articulation comprise a series of articulation plates, a first end of which is fitted such as to be mobile in rotation on one of the profiled panels adjacent in pairs, and a second, opposite end, which is fitted such as to be mobile in rotation and in sliding on the other one of the profiled panels adjacent in pairs;
- the means for articulation comprise a case comprising an oblong opening, receiving a sliding shaft which is associated with the second end of part of the associated articulation plates of the series of articulation plates, and an orifice for receipt of a fixed shaft which is associated with the first end of the other part of the associated articulation plates of the series of articulation plates;
- the device comprises means for locking of the configuration of use;
- the locking means comprise a sliding locking element arranged in a groove of a lateral profiled part of one of the two adjacent panels;
- the locking means comprise means which form a cam unit which are fitted on a lateral or transverse profiled part of one of the two adjacent panels, and a retention shaft which is fitted on a lateral or transverse profiled part of the other one of the two adjacent panels, the retention shaft being designed such as to cooperate with the means forming a cam unit in the configuration of use of the device;
- the means which form a cam unit comprise a hook which is rotated by a control shaft, and is fitted such as to translate thereon in a direction perpendicular to the control shaft;
- the means which form a cam unit also comprise a locking element which makes it possible to control and lock conditionally a displacement of translation of the hook relative to the control shaft;
- the device also comprises means which form a cover covering a lateral face of the profiled panels;
- the means which form a cover a lateral face of the electronic display screen associated with the profiled panel;
- the means which form a cover are fitted removably;
- the means which form a cover comprise magnetic assembly elements;
- the locking means comprise a profiled section which is fitted such as to slide in an inner section of a lateral profiled part of one of the two adjacent panels; and
- the section comprises a pin which extends projecting, and cooperates with a slot provided in a flank of the lateral profiled part of said one of the two adjacent panels.

BRIEF DESCRIPTION OF THE FIGURES

Other characteristics and advantages of the invention will become apparent from reading the following description of an embodiment of the invention. In the appended drawings.

For the sake of greater clarity, elements which are identical or similar have identical reference signs in all of the figures.

DETAILED DESCRIPTION OF AN EMBODIMENT

Figure 2:
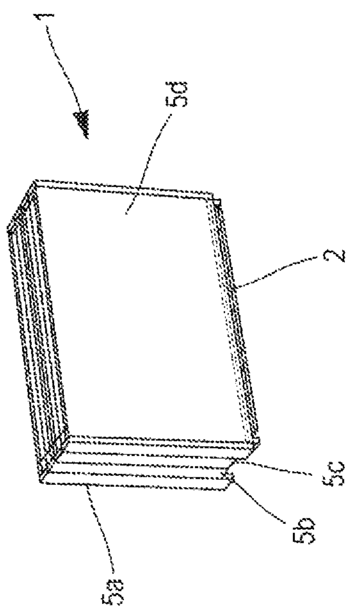
FIG. 2 is a three-dimensional view of the electronic display device of the kakemono type in FIG. 1 in the configuration of transport.
Figure 1:
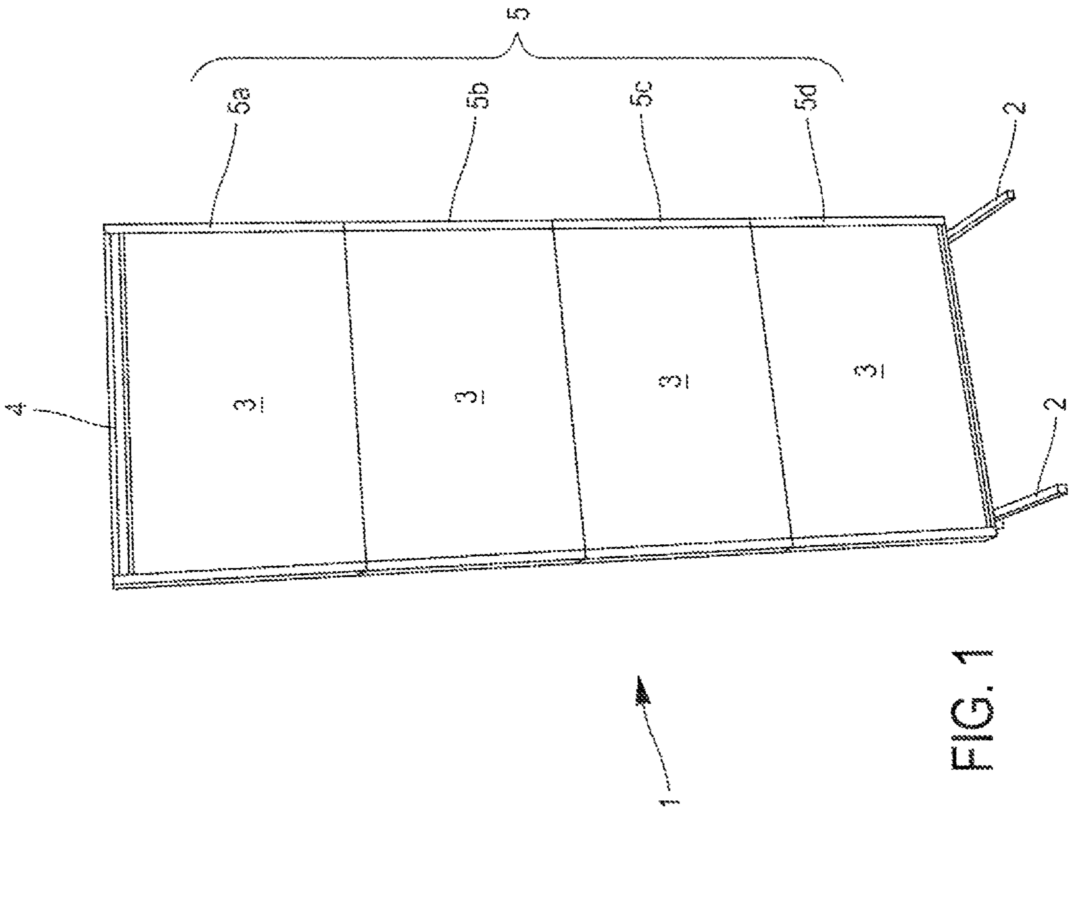
FIG. 1 is a three-dimensional view of an electronic display device of the kakemono type according to the invention in the configuration of use.
Figure 3:
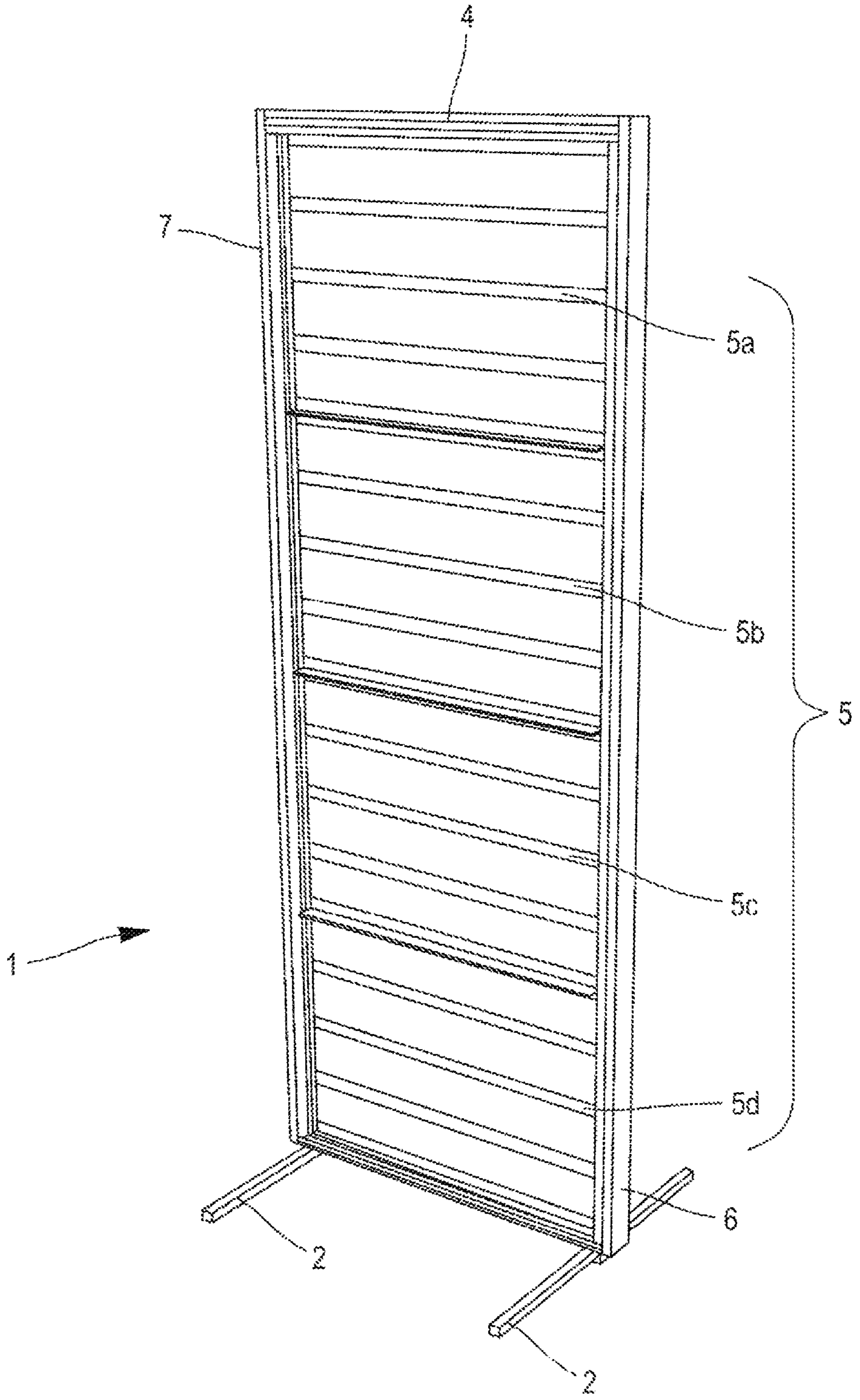
FIG. 3 is a three-dimensional view of the profiled panel structure of the device in FIG. 1.

With reference to FIGS. 1 to 3, a description will be provided of an electronic display device 1 of the kakemono type according to the invention. FIG. 1 illustrates a configuration of use of the electronic display device 1 of the kakemono type according to the invention. In this configuration of use, the electronic display device 1 of the kakemono type according to the invention is deployed, in this case vertically. The electronic display device 1 of the kakemono type according to the invention comprises a support structure 5 comprising a series of profiled panels 5*a*, 5*b*, 5*c*, 5*d* positioned in an adjacent manner in pairs, as well as a series of electronic display screens 3, in this case four of them, which are adjacent in pairs. Each of the electronic display screens 3 of the series of electronic display screens 3 is assembled on a profiled panel 5*a*, 5*b*, 5*c*, 5*d* which is associated with it of the series of profiled panels. For their part, each of the profiled panels 5*a*, 5*b*, 5*c*, 5*d* comprises an assembly of lateral profiled parts 9 and transverse profiled parts 51 which are assembled together in a known manner.

In the configuration of use, the electronic display device 1 of the kakemono type according to the invention is deployed, in this case vertically, with the series of profiled panels 5*a*, 5*b*, 5*c*, 5*d* which form the support structure 5 being designed such that two adjacent panels 5*a*, 5*b*, 5*c*, 5*d* are stacked on one another. For this purpose, the electronic display device 1 of the kakemono type according to the invention comprises a series of feet 2 on which a first one 5*d* of the profiled panels is supported vertically. Next, a second one 5*c* of the profiled panels is supported vertically on the first one 5*d* of the profiled panels, such as to be on the same plane. Then, similarly, a third 5*b* one of the profiled panels is supported vertically on the second one 5*c* of the profiled panels, such as to be on the same plane as the first 5*d* and second ones 5*c* of the profiled panels. Finally, in this case illustrated in the figures, a fourth one 5*a* of the profiled panels is supported vertically on the third one 5*b* of the profiled panels, such as to be on the same plane as the first 5*d*, second 5*c* and third 5*b* ones of the profiled panels. The fourth one 5*a* of the profiled panels comprises an end profiled part 4 which is positioned at the top of the electronic display device 1 of the kakemono type according to the invention in the configuration of use.

In the configuration of transport, the electronic display device 1 of the kakemono type according to the invention is folded onto itself. The support structure 5 is thus folded in the form of an accordion as illustrated in FIG. 2, with the series of feet 2 being folded back under the first one 5*d* of the profiled panels. The second one 5*c* of the profiled panels is folded back onto the first one 5*d* of the profiled panels, with the two adjacent panels 5*d*, 5*c* being articulated to one another by means of means for articulation 8 which will be described subsequently and illustrated in FIGS. 4 to 6. Similarly, the third one 5*b* of the profiled panels is folded back onto the second one 5*c* of the profiled panels, with the two adjacent panels 5*c*, 5*b* being articulated to one another by means of means for articulation 8. Similarly, the fourth one 5*a* of the profiled panels is folded back onto the third one 5*b* of the profiled panels, with the two adjacent panels 5*b*, 5*a* being articulated to one another by means of means for articulation 8. In the configuration of transport, the profiled panels 5*a* to 5*d* are positioned adjacent to one another and parallel to one another.

Figure 4A:
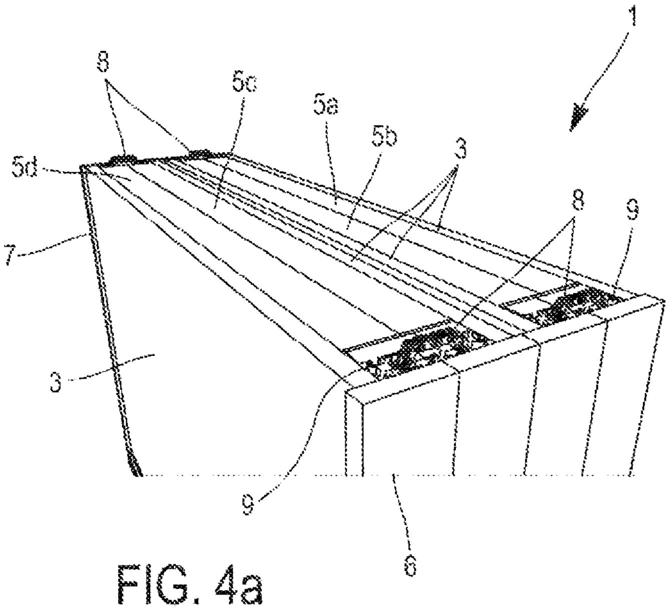
FIGS. 4*a* and 4*b* are three-dimensional views in detail of the articulations of the electronic display device of the kakemono type in FIG. 1 in the configuration of transport.
Figure 4B:
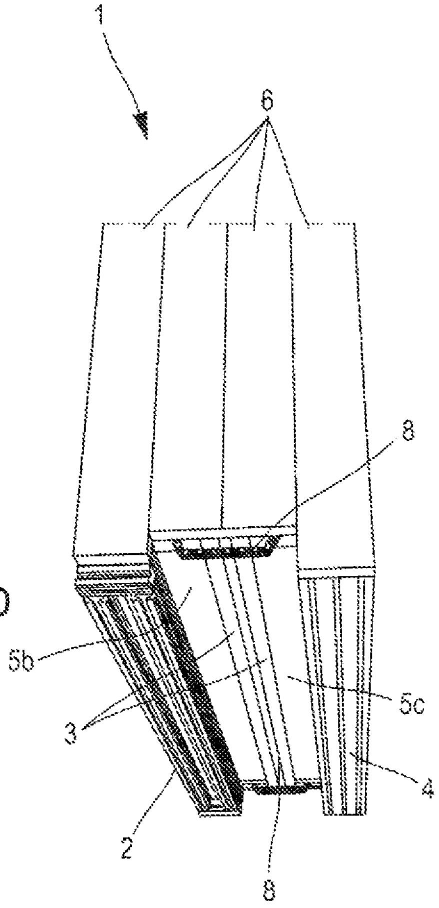

FIGS. 4*a* and 4*b* show more precisely the arrangement of the electronic display device 1 of the kakemono type according to the invention in the configuration of transport. In this configuration, the first 5*d* and second 5*c* ones of the profiled panels on the one hand, and the third 5*b* and fourth 5*a* ones of the profiled panels on the other hand are positioned adjacent to one another, parallel to one another, back to back: a rear face of the first 5*d* one (and respectively of the third 5*b* one) of the profiled panels is facing a rear face of the second 5*c* one (and respectively of the fourth 5*a* one) of the profiled panels. Whereas the second 5*c* one and third 5*b* one of the profiled panels are positioned adjacent to one another, parallel to one another, face-to-face: a front face of the electronic display screen 3 which is associated with, and secured on, the second 5*c* one of the profiled panels faces a front face of the electronic display screen 3 which is associated with, and secured on, the third 5*b* one of the profiled panels. Thus, in the configuration of transport, the support structure 5 is folded in the form of an accordion, and consequently, the electronic display device 1 of the kakemono type according to the invention is also folded in the form of an accordion.

The electronic display device 1 of the kakemono type according to the invention also comprises means which form a cover 6, 7 covering at least one lateral face of the profiled panels 5*a* to 5*d*, in particular a lateral face of the lateral profiled parts 9 of the profiled panels 5*a* to 5*d*. According to a variant embodiment, the means which form a cover 6, 7 also cover a lateral face of the electronic display screens 3 associated with the profiled panels 5*a* to 5*d*. These means which form a cover 6, 7 are fitted removably on the support structure 5. For example, if at least the lateral profiled parts 9 of the profiled panels 5*a* to 5*d* are magnetic, the means which form a cover 6, 7 comprise magnetic assembly elements, such as magnets.

Figure 6:
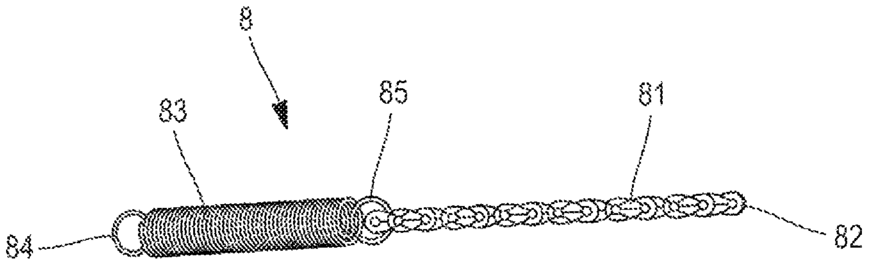

A description in greater detail will now be provided of an embodiment of the means for articulation 8 making it possible to articulate two panels 5*a* to 5*d* adjacent in pairs. With reference to FIG. 6, the means for articulation 8 comprise an elongate element 8. In this case, this elongate element comprises a traction spring 83 and a chain 61. The traction spring 83 comprises a free end 84 and an end 85 for connection to an end of the chain 81. The chain 81 also comprises a free end 82. Thus, the free ends 82 of the chain 81 and 84 of the traction spring 83 form the first and second free ends of the elongate element 8. Thus, the elongate element 8 is at least partly resiliently deformable as a result of the presence of the traction spring 83. According to a variant embodiment, the traction spring 83 is replaced by any equivalent resilient means permitting resilient longitudinal deformation. According to other variant embodiments, the chain 81 is replaced by a cable which is or is not made of metal, or by any other equivalent means.

Figure 5:
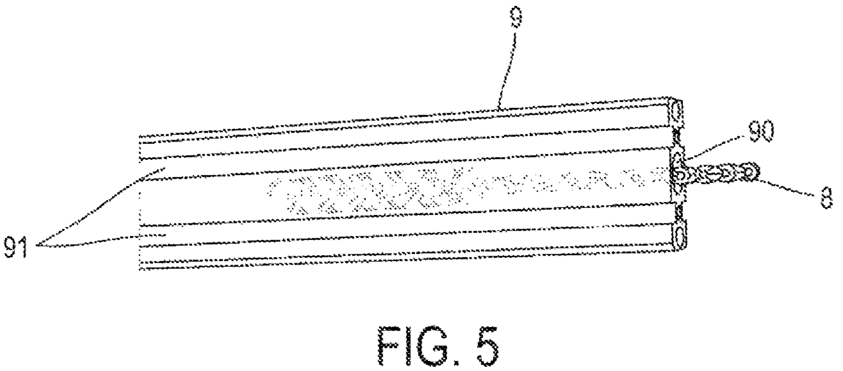
FIGS. 5 and 6 are three-dimensional views of the articulation shown in FIGS. 4*a* and 4*b*.

The means for articulation 8 are positioned within the lateral profiled parts 9 of two profiled panels 5*a* to 5*d* which are adjacent to one another, the associated lateral profiled parts 9 being designed to come into position abutting one another in the configuration of use of the electronic display device 1 of the kakemono type according to the invention. FIG. 5 illustrates the positioning of the elongate element 8 previously described and forming the means for articulation, which element is positioned in one of said lateral profiled parts 9. In cross-section, the lateral profiled part 9 has a generally rectangular form. It comprises a central hole 90 delimiting the receptacle in which the free end 84 of the traction spring 83 of the elongate element 8 is inserted. Securing with the lateral profiled part 9 of this free end 84 is provided. Thus, the second free end of the elongate element 8 is secured on one of the two profiled panels 5*a* to 5*d* adjacent in pairs. Similarly, the free end 82 of the chain 81 is inserted in the central hole 90 of the lateral profiled part 9 of the other one of the two profiled panels 5*a* to 5*d* adjacent in pairs. Securing with the lateral profiled part 9 of this free end 82 is also provided. Thus, the first free end of the elongate element 8 is secured on the other one of the two profiled panels 5*a* 5*d* adjacent in pairs. Once the resiliently deformable part of the elongate element 8, in this case the traction spring 83, is in place, tension is applied to it. This tension makes it possible to retain the two profiled panels 5*a* to 5*d* adjacent in pairs against one another simply, when the structure 5, and thus the electronic display device 1 of the kakemono type according to the invention, is in the configuration of use. Also, the chain 81 makes it possible to fold the two profiled panels 5*a* to 5*d* adjacent in pairs against one another, when the structure 5, and thus the electronic display device 1 of the kakemono type according to the invention, is in the configuration of transport: the flexibility of the chain 81 allows the elongate element 8 to adopt the form of the fold between two profiled panels 5*a* to 5*d* adjacent in pairs, in this configuration of use of the electronic display device 1 of the kakemono type according to the invention, as illustrated in FIGS. 4*a* and 4*b*.

Figure 7:
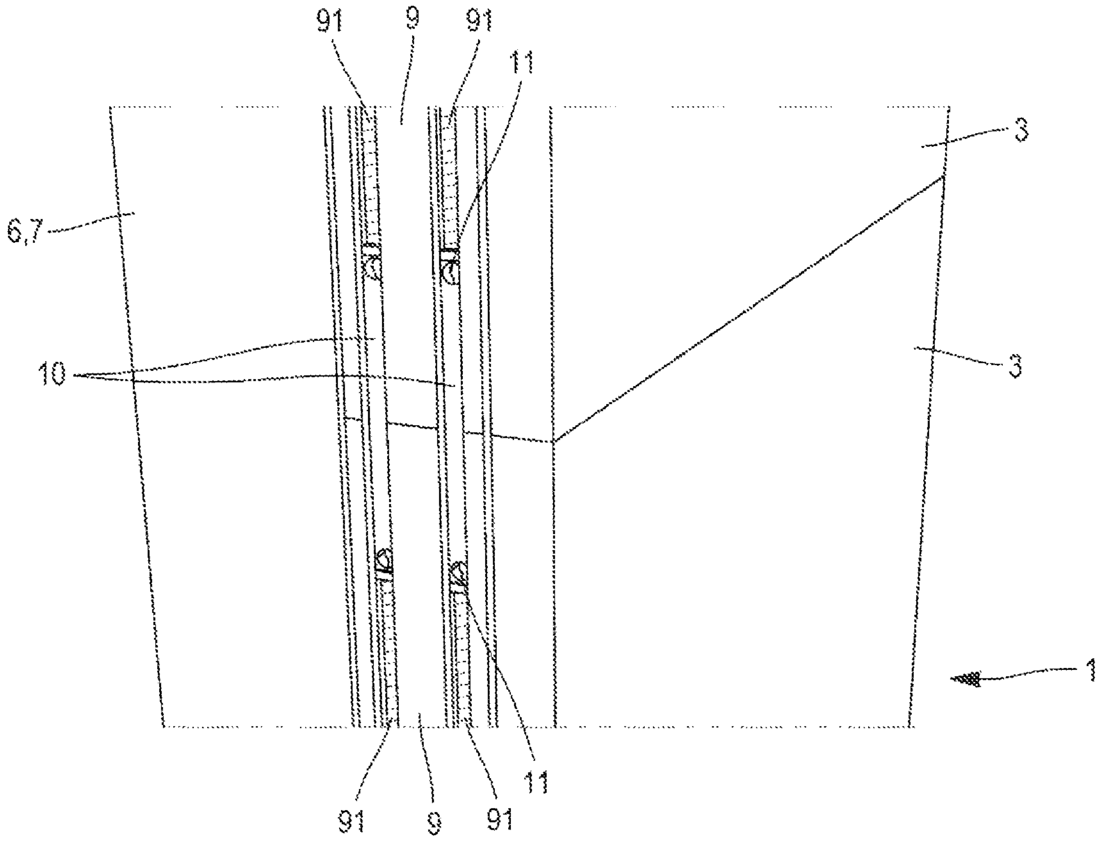
FIG. 7 is a view in detail of the locking means of the electronic display device of the kakemono type in FIG. 1 in the configuration of use.

In order to make the configuration of use secure, the electronic display device 1 of the kakemono type according to the invention comprises locking means 10, 11. In this case, these means are positioned at lateral profiled parts 9 of the two profiled panels 5*a* to 5*d* adjacent in pairs to be locked. In this case, the locking means comprise a locking element 10 which is fitted such as to slide within a groove 91 arranged in the lateral profiled part 9 of one of the two profiled panels 5*a* to 5*d* adjacent in pairs: once the electronic display device 1 of the kakemono type according to the invention is in the configuration of use, with the respective lateral profiled parts 9 in position abutting one another, the locking element 10 is maneuvered, via means for implementation 11, by translation in the groove 91 of one of the lateral profiled parts 9, until it is partly inserted in the groove 91 of the other one of the lateral profiled parts 9 which is then abutting one of the lateral profiled parts 9. According to a variant embodiment, the lateral profiled parts 9 comprise two grooves 91 which are parallel to one another, with a locking element 10 being provided in each of the grooves, as illustrated in FIG. 7. According to a variant embodiment, the locking means comprise fastenings of the toggle clamp or fastening clamp type which in themselves are known to persons skilled in the art. According to another variant embodiment, the locking means comprise a device for locking by means of an electromagnet.

FIGS. 12 to 15 illustrate a second embodiment of the means 800 for locking of the configuration of use of the electronic display device 1 of the kakemono type according to the invention. In this case, the locking means 800 comprise two parts in the form of housings 810, 820. Each of the parts 810, 820 is designed to be fitted in the lateral 9 or transverse 51 profiled parts forming the profiled panels 5*a* to 5*d* adjacent in pairs to be locked, respectively. The housing 810 which forms the first part is hollow, and comprises an open lateral face 815 which permits access to an interior of the housing 810. The housing 810 also comprises a retention shaft 811 which passes through the interior of the housing 810.

Similarly, the housing 820 which forms the second part is hollow, and comprises an open lateral face 825 which permits access to an interior of the housing 820. The housing 820 also comprises a control shaft 821, which passes through the interior of the housing 820, and is fitted such as to be mobile in rotation in the housing 820. The housing 820 also comprises means which form a cam unit 822, 823 fitted on the control shaft 821, such as to be able to be driven by the control shaft 821, between an unlocked position, illustrated in FIG. 13, in which the means forming a cam unit 822, 823 are accommodated completely in the interior of the housing 820, and a locked position, illustrated in FIGS. 12, 14 and 15, in which the means forming a cam unit 822, 823 extend partly projecting from the lateral face 825 of the housing 820. In this case, as illustrated in FIG. 14, the control shaft 821 is implemented by means of a hexagonal head key so-called Allen key.

The means which form a cam unit 822, 823 in this case comprise a hook 822, as well as a locking element 823. During implementation of the means which form a cam unit 822, 823, the locking element 823 makes it possible to make the hook 822 go from a position of bringing into place illustrated by the hook in a dash line 822' in FIG. 15, to a locking position illustrated in the same figure by the hook 822 in a solid line, and conversely. The change of position of the hook takes place in this case according to a translation perpendicular to the control shaft 821.

Figure 12:
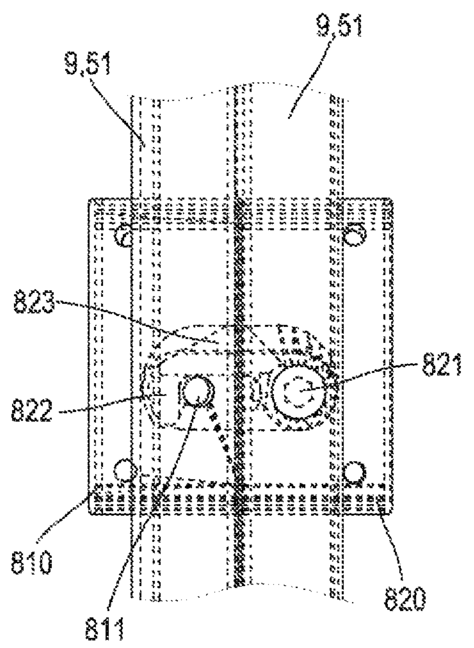
FIG. 12 is a partial view from the front of a variant embodiment of the locking means of the electronic display device of the kakemono type in FIG. 1 in the configuration of use.
Figure 13:
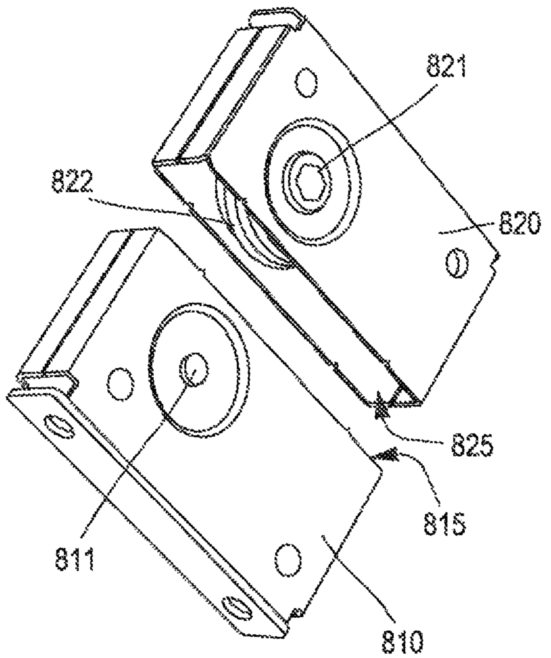
FIG. 13 is a three-dimensional view of the locking means in FIG. 12, the hook being retracted.
Figure 14:
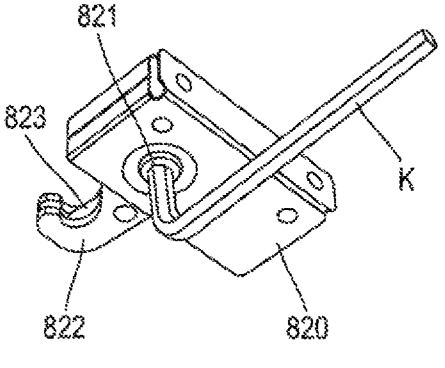
FIG. 14 is a three-dimensional view of part of the locking means in FIG. 12, with the hook deployed.
Figure 15:
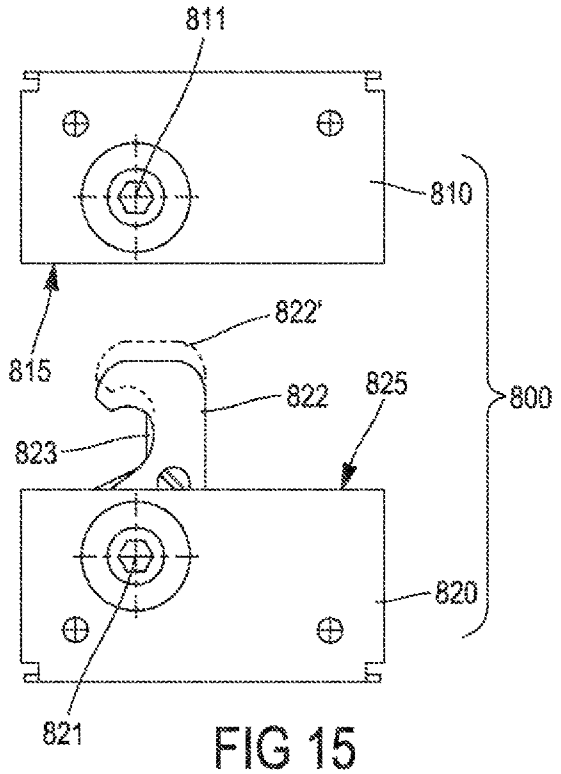
FIG. 15 is a view from the front of the locking means in FIG. 12, with the hook deployed.

In use, the two housings 810 and 820 come opposite one another, such that their lateral faces 815 and 825 extend facing one another, as illustrated in FIG. 12 or FIG. 13. Once the two housings 810 and 820 are in this respective position, the means which form a cam unit 822, 823 are implemented by means of the key K engaged with the control shaft 821. In an initial stage, the means which form a cam unit 822, 823 go from the unlocked position to the locked position, with the hook 822 being in the position of bringing into place (hook in a dash line 822') retained by the locking element 823, with the locking element projecting in a shackle of the hook 822. Then, the locking element 823 is supported on the retention shaft 811 of the housing 810, thrusting the locking element 823. This has the effect of releasing the hook 822, which then goes at the end of its movement into the locking position (hook 822 in a solid line) around the retention shaft 811: thus the lateral 9 or transverse 51 profiled parts forming the profiled panels 5*a* to 5*d* adjacent in pairs to be locked, respectively, are supported on one another and thus retained in a secure manner.

Conversely, the unlocking operation consists in a first stage of making the hook 822 go from its locking position to its position of bringing into place (hook in a dash line 822'), then blocking it in this position of bringing into place with the locking element 823, which once again projects into the shackle of the hook 822, then, the means which form a cam unit 822, 823 are repositioned in the interior of the housing 820. It is apparent from the foregoing that a locking element 823 makes it possible to control and lock conditionally the displacements of translation of the hook 822 relative to the control shaft 821.

Figure 16:
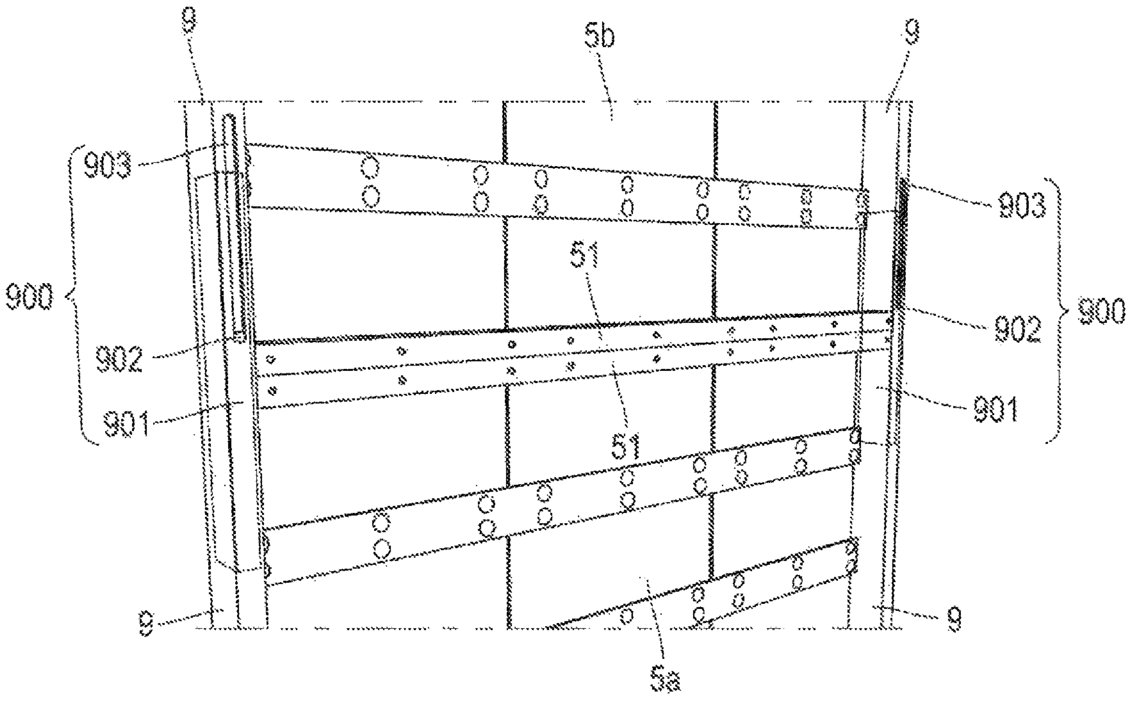
FIG. 16 is a partial three-dimensional view where another variant embodiment of the locking means of the electronic display device of the kakemono type according to the invention is in the locked position.
Figure 17:
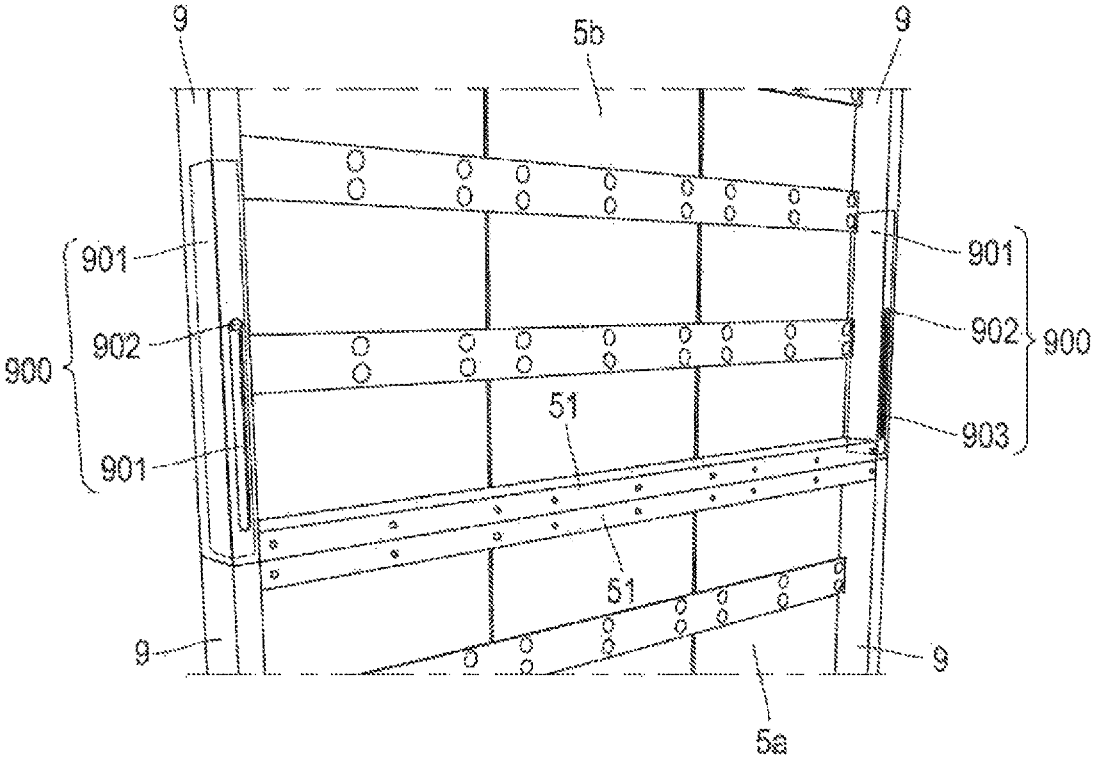
FIG. 17 is a partial three-dimensional view where the variant embodiment in FIG. 16 of the locking means of the electronic display device of the kakemono type is in the unlocked position.

FIGS. 16 and 17 illustrate a third embodiment of the locking means 900 of the configuration of use of the electronic display device 1 of the kakemono type according to the invention. The locking means 900 make it possible to lock two panels 5*a* to 5*d* adjacent in pairs, in the configuration of use of the electronic display device 1 of the kakemono type according to the invention. In this case, the panels 5*a* and 5*b* equipped with locking means 900 are illustrated. The following description is valid for locking of the panels 5*b* and 5*c*, as well as the panels 5*c* and 5*d*.

In this case, the locking means 900 comprises a solid or hollow section 901 of profiled part, with a cross-section having an outer form which is complementary with an inner cross-section of the lateral profiled part 9. The section 901 is fitted such as to slide within the profiled part 9 of the panel 5*b*. The sliding movement is along a longitudinal axis of the lateral profiled part 9. In order to limit this sliding movement, the locking means 900 comprises a pin 902 and a slot 903. The pin 902 is placed on the section 901, extending projecting from a lateral face of the section 901. The slot 903 is provided in the thickness of a flank of the lateral profiled part 9 of the panel 5*b* coming above the panel 5*a* in the configuration of use of the electronic display device 1 of the kakemono type according to the invention. In particular, this slot 903 is positioned at an end of the lateral profiled part 9 of the panel 5*b* which comes opposite the lateral profiled part 9 of the adjacent panel 5*a* in a configuration of use of the electronic display device 1 of the kakemono type according to the invention. The pin 902 cooperates with the slot 903, a length of which determines an amplitude of the sliding movement of the section 901 within the lateral profiled part 9 of the panel 5*b*.

In the configuration of use of the electronic display device 1 of the kakemono type according to the invention illustrated in FIG. 16, a part of the section 901 slides by sliding in the inner cross-section of the lateral profiled part 9 of the adjacent panel 5*a*, which is then positioned below the panel 5*b*. The pin 902 abuts the end, which is then low, of the slot 903. The panel 5*b* is then locked into the position of use on, and with, the adjacent panel 5*a*. This locking takes place automatically by the effect of terrestrial gravity on the section 901, which comes into this locking position, illustrated in FIG. 16, thanks to its weight.

In order to permit return to the configuration of transport of the electronic display device 1 of the kakemono type according to the invention, the locking means 900 are positioned in the unlocking mode illustrated in FIG. 17. The section 901 is raised until the pin 902 is supported on an end, which is then high, of the slot 903, the section 901 then being completely disengaged from the lateral profiled part 9 of the adjacent panel 5*a*, and completely engaged in the lateral profiled part 9 of the panel 5*b*, by manual support action on the pin 902 for example. The panel 5*b* can then be folded back onto the panel 5*a*, for the configuration of transport of the electronic display device 1 of the kakemono type according to the invention.

According to a variant embodiment, the sliding movement of the section 901 can be motorized.

Figure 8A:
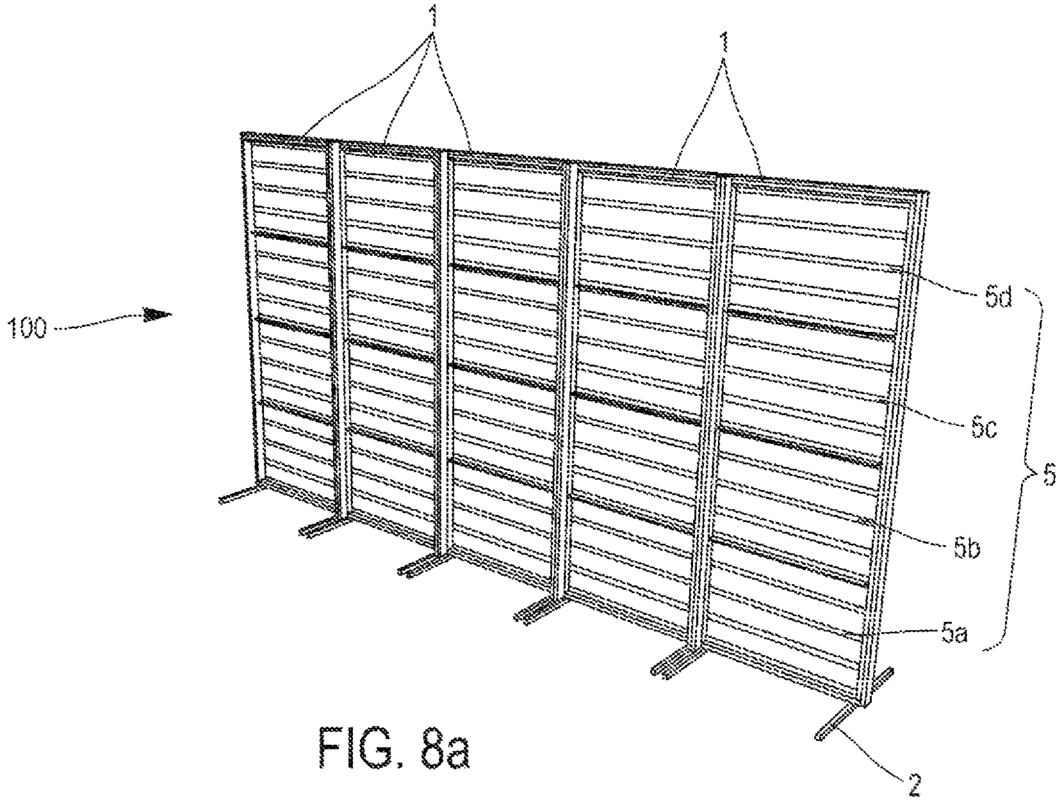
FIGS. 8*a* and 8*b* are three-dimensional views of an assembly of electronic display devices of the kakemono type in FIG. 1 in the configuration of use, assembled in order to form a giant display screen.
Figure 8B:
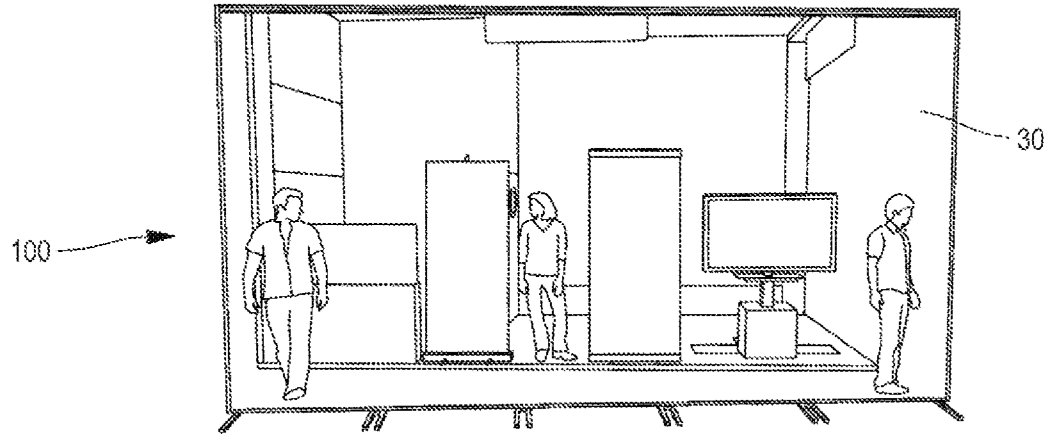

With reference now to FIGS. 8*a* and 8*b*, it is possible to associate a plurality of electronic display devices 1 of the kakemono type according to the invention, such as to form a giant kakemono 100. For this purpose, it is sufficient to abut different electronic display devices 1 of the kakemono type according to the invention by assembling them in pairs via the means which form a cover 6, 7, which then act as assembly means for two electronic display devices 1 of the kakemono type according to the invention. Thus, in operation, a giant display surface 30 is obtained simply and rapidly. According to a variant embodiment, two electronic display devices 1 of the kakemono type according to the invention are assembled by means of the locking means 800 according to the second embodiment previously described with reference to FIGS. 12 to 15.

A second embodiment of the means for articulation 18 making it possible to articulate two panels 5*a* to 5*d* adjacent in pairs will now be described with reference to FIGS. 9*a* to 11. The following description is valid for the articulation of the panels 5*b* and 5*c*, as well as the panels 5*c* and 5*d*.

Figure 11:
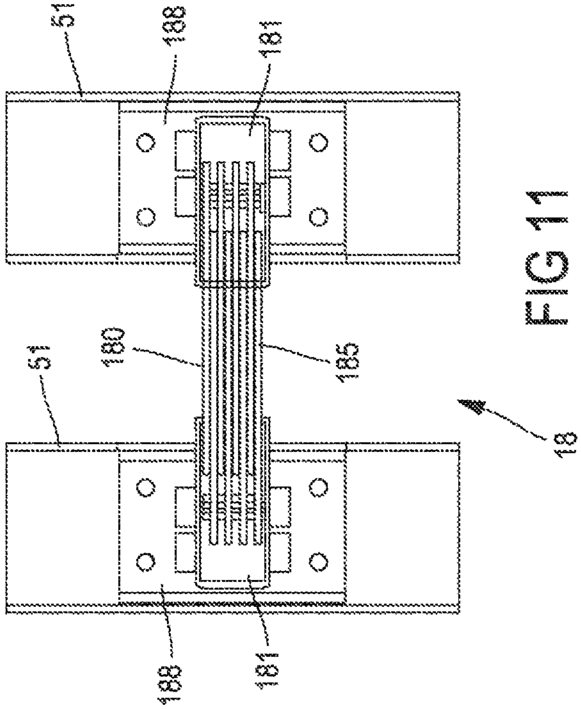
FIG. 11 is a view from above of the articulation in FIGS. 9*a* 9*e;*

The means for articulation 18 comprise first and second identical cases 181. In this case, the first case 181 is fitted secured in an upper transverse profiled part 51 of the panel 5*a*. In this case, the second case 181 is fitted secured in a lower transverse profiled part 51 of the panel 5*b*, adjacent to the panel 5*a*, with the lower transverse profiled part 51 of the panel 5*b* extending in parallel with, and facing the upper transverse profiled part 51 of the panel 5*a*. In this case, each of the cases 181 is secured on the respective transverse profiled parts 51 by means of a plate 188, which is optionally profiled as illustrated in FIG. 11. Each of the cases 181 comprises a straight oblong opening 182 provided in each of the lateral walls of the case 181, which openings extend facing and spaced from one another. A sliding shaft 183 is fitted such as to translate in these oblong openings 182. In addition, each of the cases 181 also comprises receipt orifices for fitting which is fixed or with rotation of a fixed shaft 184 positioned in a manner which is offset but parallel to the preceding shaft 183. Globally, the oblong openings 182 are positioned spaced from an instantaneous axis of rotation of the means for articulation 18, whereas the orifices for receipt of the fixed shafts 184 are positioned close to this instantaneous axis of rotation.

Figure 10:
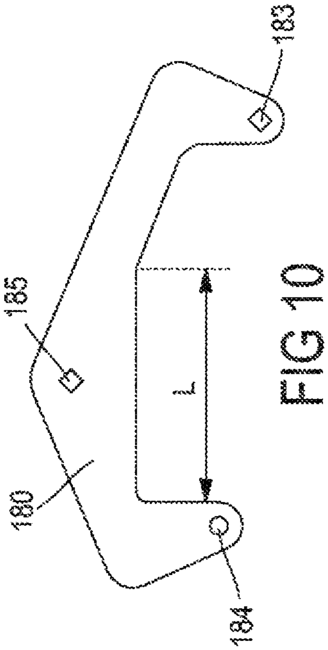
FIG. 10 is a side view of an articulation element of the articulation in FIGS. 9*a* to 9*e;*

Connecting the two cases 181, the means for articulation 18 comprise a series of articulation plates 180, in this case eight of them, which are parallel to one another, offset such as to zig-zag relative to one another on their plane, and fitted such as to be mobile in rotation on their plane relative to one another and on a rotational shaft 185, the rotational shaft 185 being parallel to the instantaneous axis of rotation of the means for articulation 18. Each of the articulation plates 180 has a form globally in the shape of an "n" or staple, as can be seen in FIG. 10, comprising two branches, which in this case are vertical in the figure, and a base with a horizontal part with an length L. At the free ends of the branches, the articulation plate 180 comprises orifices for passage of the fixed 184 and sliding 183 shafts respectively. The base of the articulation plate 180 also comprises a third orifice for passage of the rotational shaft 185 which connects such as to be mobile in rotation the different articulation plates 180 of the series of articulation plates 180 of the means for articulation 18. The orifices for passage are positioned such that, in orthogonal projection on a straight line passing via the horizontal portion with a length L of the base:

- the orthogonal projection of the orifice for passage of the rotational shaft 185 is a median point of the horizontal portion with a length L;
- a distance between the orthogonal projection of the orifice for passage of the fixed shaft 184, and the orthogonal projection of the orifice for passage of the rotational shaft 185 is smaller than a distance between the orthogonal projection of the orifice for passage of the sliding shaft 183 and the orthogonal projection of the orifice for passage of the rotational shaft 185, which, inter alia, permits offset fitting in the form of a zig-zag of the articulation plates 180 relative to one another.

The articulation plates 180 are fitted as follows: the orifice for passage of the fixed shaft 184 of the articulation plate 180 receives the fixed shaft 184 of one of the two cases 181, and the orifice for passage of the sliding shaft 183 receives the sliding shaft 183 of the other one of the two cases 181. The following articulation plate 180 is fitted in an alternative manner: the orifice for passage of the fixed shaft 184 of the articulation plate 180 receives the fixed shaft 184 of the other one of the two cases 181, and the orifice for passage of the sliding shaft 183 receives the sliding shaft 183 of one of the two cases 181, and so on.

Figure 9C:
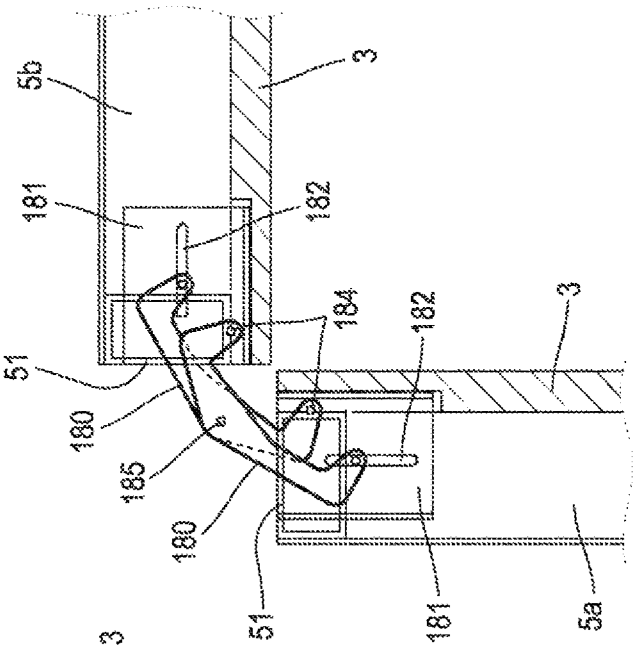
FIGS. 9*a* to 9*e* are partial views in cross-section of a variant embodiment of an articulation of the electronic display device of the kakemono type in FIG. 1.
Figure 9B:
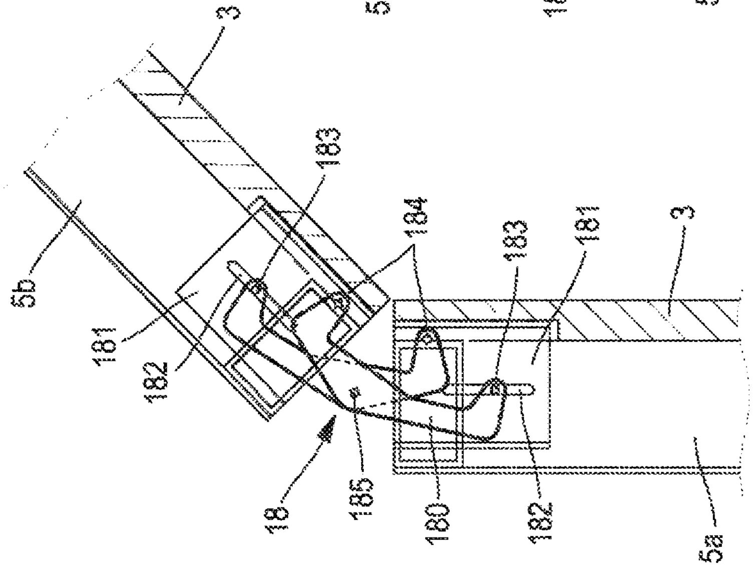
Figure 9A:
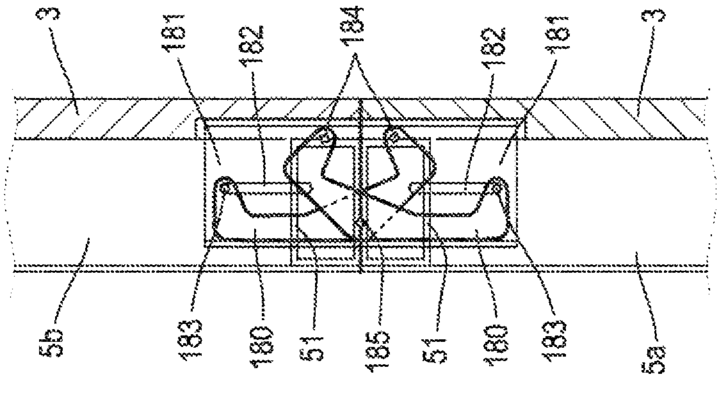
Figure 9D:
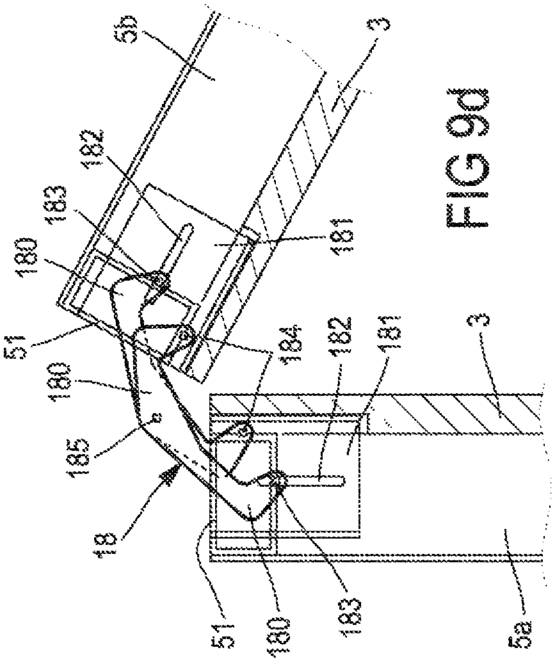
Figure 9E:
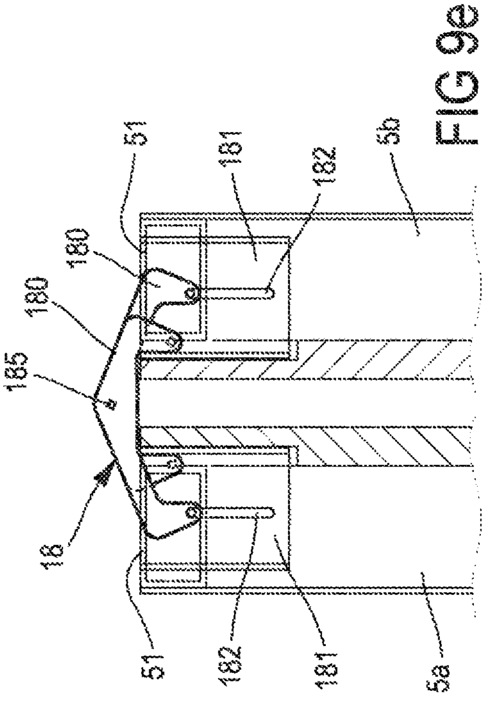

The operation of the means for articulation 18 which have just been described is illustrated in FIGS. 9*a* to 9*e*. FIG. 9*a* illustrates an unfolded position of the adjacent panels 5*a* and 5*b*, and FIG. 9*e* illustrates a folded-back position of the two said panels. At the start of the movement, in FIGS. 9*a* to 9*c* approximately, the instantaneous axis of rotation of the means for articulation 18 is situated substantially at two opposite corners of the electronic display screens 3. Then, with the movement continuing, in FIG. 9*d*, the instantaneous axis of rotation of the means for articulation 18 is "projected" by moving the electronic display screens 3 apart, until the end of the movement illustrated in FIG. 9*e*. At the end of the movement, the instantaneous axis of rotation of the means for articulation 18 is situated at the orthogonal projection of the orifice for passage of the rotational shaft 185 previously described, i.e. the median point of the horizontal portion with a length L. Thus, a structure of this type of the means for articulation 18 allows no collision to occur during the movement between the two electronic display screens 3 fitted on the panels 5*a* and 5*b*, in this case while assuring a movement which is constant, safe and repeatable. The length L is selected such that, at the end of the movement, the electronic display screens 3 of the panels 5*a* and 5*b* extend parallel, facing one another and spaced from one another, with the means for articulation 18, as a result of their structure, maintaining this distance during transport of the electronic display device 1 of the kakemono type according to the invention.

It will be appreciated that it is possible to make numerous modifications to the invention without however departing from the context thereof.

The invention claimed is:

1. An electronic display device, which can be reconfigured between a configuration of transport and a configuration of use, the electronic display device comprising:

- a structure comprising a series of profiled panels, the profiled panels of the series of profiled panels being adjacent in pairs,
- for each pair of adjacent profiled panels, means for articulation between the two adjacent profiled panels, and
- a series of electronic display screens, an electronic display screen of the series of electronic display screens being associated with, and assembled on, a respective profiled panel of the series of profiled panels,
- wherein the means for articulation are arranged such that, in the configuration of transport, the structure is folded in the form of an accordion,
- wherein the means for articulation of each pair of adjacent profiled panels comprise a series of articulation plates, a first end of which is fitted such as to be mobile in rotation on one of the profiled panels adjacent of the pair, and a second, opposite end, which is fitted such as to be mobile in rotation and in sliding on the other one of the profiled panels adjacent of the pair.

2. The electronic display device as claimed in claim 1, wherein the means for articulation of each pair of adjacent profiled panels comprise an elongate element which is at least partly resiliently deformable, the elongate element comprising a first end secured on one of the two profiled panels adjacent of the pair, and a second end secured on the other one of the two profiled panels adjacent of the pair.

3. The electronic display device as claimed in claim 2, wherein the elongate element is positioned within profiled parts of the profiled panels of the corresponding pair of adjacent profiled panels, the profiled parts being designed to come into position abutting one another in the configuration of use of the device.

4. The electronic display device as claimed in claim 1, wherein the means for articulation of each pair of adjacent profiled panels comprise a case, the case comprising an oblong opening, receiving a sliding shaft which is associated with the second end of part of the associated articulation plates of the series of articulation plates, and an orifice for receipt of a fixed shaft which is associated with the first end of the other part of the associated articulation plates of the series of articulation plates.

5. The electronic display device as claimed in claim 1, wherein the electronic display device comprises means for locking of the configuration of use.

6. The electronic display device as claimed in claim 5, wherein the locking means comprise a sliding locking element arranged in a groove of a lateral profiled part of one of the profiled panels of a pair of adjacent profiled panels.

7. The electronic display device as claimed in claim 5, wherein the locking means comprise means which form a cam unit which are fitted on a lateral or transverse profiled part of one of the two profiled panels of the pair of adjacent profiled panels, and a retention shaft which is fitted on a lateral or transverse profiled part of the other one of the two profiled panels of the pair of adjacent profiled panels, the retention shaft being designed such as to cooperate with the means forming a cam unit in the configuration of use of the electronic display device.

8. The electronic display device as claimed in claim 7, wherein the means which form a cam unit comprise a hook which is rotated by a control shaft, and is fitted such as to translate thereon in a direction perpendicular to the control shaft.

9. The electronic display device as claimed in claim 8, wherein the means which form a cam unit also comprise a locking element which makes it possible to control and lock conditionally a displacement of translation of the hook relative to the control shaft.

10. The electronic display device as claimed in claim 1, wherein the electronic display device also comprises means which form a cover covering a lateral face of the profiled panels.

11. The electronic display device as claimed in claim 10, wherein the means which form a cover covering a lateral face of the electronic display screen associated with the profiled panel.

12. The electronic display device as claimed in claim 10, wherein the means which form a cover are fitted removably.

13. The electronic display device as claimed in claim 12, wherein the means which form a cover comprise magnetic assembly elements.

14. The electronic display device as claimed in claim 5, wherein the locking means comprise a profiled section which is fitted such as to slide in an inner section of a lateral profiled part of one of the two profiled panels of a pair of adjacent profiled panels.

15. The electronic display device as claimed in claim 14, wherein the profiled section comprises a pin which extends projecting, and cooperates with a slot provided in a flank of the lateral profiled part of said one of the two profiled panels of the pair of adjacent profiled panels.

* * * * *